US012688640B2

(12) United States Patent
Balanchi

(10) Patent No.: US 12,688,640 B2
(45) Date of Patent: Jul. 21, 2026

(54) ANIMATED DECORATIVE ITEMS WITH SENSOR INPUTS

(71) Applicant: MINDSCOPE PRODUCTS, INC., Glendale, CA (US)

(72) Inventor: George Balanchi, Altadena, CA (US)

(73) Assignee: MINDSCOPE PRODUCTS, INC., Glendale, CA (US)

( * ) Notice: Subject to any disclaimer, the term of this patent is extended or adjusted under 35 U.S.C. 154(b) by 0 days.

(21) Appl. No.: 18/210,414

(22) Filed: Jun. 15, 2023

(65) Prior Publication Data

US 2024/0428495 A1 Dec. 26, 2024

(51) Int. Cl.
*G06T 13/80* (2011.01)

(52) U.S. Cl.
CPC .................................... *G06T 13/80* (2013.01)

(58) Field of Classification Search
CPC ...... G03B 21/10; G03B 21/12; G03B 21/145; H04N 9/3141
USPC ........................................................ 348/744
See application file for complete search history.

(56) References Cited

U.S. PATENT DOCUMENTS

| | | | |
|---|---|---|---|
| 11,061,304 B2* | 7/2021 | Barnett .................. | G03B 21/56 |
| 2016/0047536 A1* | 2/2016 | Lien ........................ | G09F 13/04 |
| | | | 362/249.05 |
| 2018/0284587 A1* | 10/2018 | Barnett ................ | H04N 9/3179 |
| 2023/0008097 A1* | 1/2023 | Holdman ................ | G06T 15/20 |

FOREIGN PATENT DOCUMENTS

WO    WO-2010001109 A2 *   1/2010  ............. G06T 13/40

* cited by examiner

*Primary Examiner* — Justin W Rider
(74) *Attorney, Agent, or Firm* — Landmark IP Law, LLC; Gregory M Murphy

(57) ABSTRACT

The present invention is directed to a decorative item, device, or toy that may includes an animated projection and associated audio. The device may further include one or more sensors that may trigger specific actions, audio files, or activity of the device. The device may include animatronic elements that may be triggered by one or more sensors. The device may have communicative capabilities and may communicate with a user device, a network, and/or one or more other devices.

10 Claims, 11 Drawing Sheets

100

| Triggers 410 | Projection 420 | Audio 430 | Other 440 |
|---|---|---|---|
| Picked Up 411 | Startled Face Blink 421 | "Where are We Going?" 431 | Put Arms Up 441 |
| Impact 412 | Close Eyes Light 422 | Ouch! 432 | Shake 442 |
| Voice Trigger "Joke" 413 | Identify Speech Triggers Animation Audio 423 | Tell Joke 1 433 | N/A 443 |
| Lights Off 414 | Scanned Face Mean Face 424 | What Happened? End Laugh 434 | N/A 444 |
| Camera Sensor 415 | Id User Smile 425 | "Hi Tommy" High-5 435 | Raise Arm 445 |

FIG. 4

ANIMATED DECORATIVE ITEMS WITH SENSOR INPUTS

BACKGROUND

There are many situations in which decorative objects are used. For example, at holidays or special events, decorations may be used to celebrate an occasion. In some instances, motors or other devices are used to animate the objects. Such techniques have many limitations, particularly in terms of cost and complexity.

However, decorative items and/or toys with projection animation have several drawbacks. For one, a lack of interactivity. Accordingly, it is desirable to have decorative animated items with user interaction, for example, initiated by sensor input.

SUMMARY OF THE INVENTION

In accordance with some embodiments of the present invention, aspects may include a device comprising: a projector, contained within cavity and configured to project an animated image that causes at least one physical feature of the decorative shape to appear to be moving, when viewed from an exterior of the device; and an exterior wall defining a cavity therein, the exterior wall comprising an interior surface and an exterior surface, the exterior wall having a thickness and material composition selected such that, in response to projection of the animated image onto the front portion of the interior surface, the animated image is visible on the exterior surface; at least on sensor configured to detect at least one condition of the device or an environment of the device, the at least one sensor operatively connectable to the projector to activate, deactivate, and/or modify display of the animated image and/or any associated audio in response to detection of the condition.

In accordance with some embodiments of the present invention, aspects may include a device wherein the at least one sensor comprises one or more of a proximity sensor, accelerometer, light sensor, temperature sensor, pressure sensor, motion sensor, sound sensor, spring sensor, ball sensor, and/or angular velocity sensor.

In accordance with some embodiments of the present invention, aspects may include a device wherein the at least on condition of the device or an environment of the device comprises one or more of presence of a user, motion of the user, sound made by the user; motion of the device, impacts of the device, proximity of other devices, and/or control signals received from a user.

In accordance with some embodiments of the present invention, aspects may include a device comprising: an exterior wall, wherein the entirety of the exterior wall defines a decorative shape of the device and further defines an interior surface and an exterior surface; a projector, supported by the projector support within the cavity and contained entirely within the device, the projector configured to project an animated image that causes the at least one physical feature of the decorative shape to appear to be moving, when viewed from the exterior of the device; a wireless communication device, contained entirely within the device, configured to receive a signal representing an animated image via a wireless communication medium; and the projector being connected to the wireless communication device and configured to project the animated image represented by the received signal.

These and other aspects will become apparent from the following description of the invention taken in conjunction with the following drawings, although variations and modifications may be affected without departing from the scope of the novel concepts of the invention.

DESCRIPTION OF THE FIGURES

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 4 illustrates exemplary data store records, in accordance with some embodiments of the present invention.

DETAILED DESCRIPTION

Figure 1:
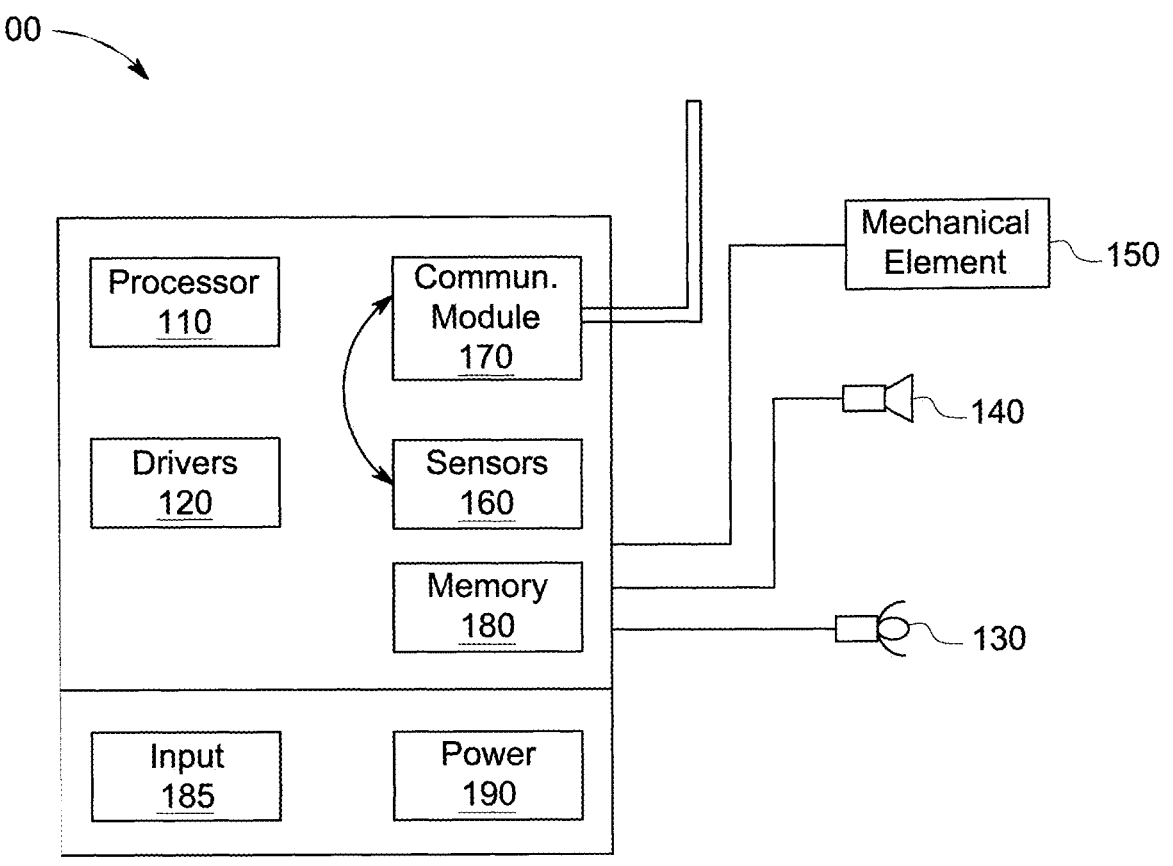
FIG. 1 illustrates an exemplary system block diagram, in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructures are omitted for clarity and conciseness. Moreover, as used herein, the singular may be interpreted in the plural, and alternately, any term in the plural may be interpreted to be in the singular.

The present invention is directed to an animated decorative item. Such decorative item may be themed in accordance with a particular holiday or event. For example, the decorative item may be an animated pumpkin or scary head or face for Halloween or fall, an animated reindeer, snowman, or decorated tree for Christmas or winter, an animated bunny or chick for easter. Any character or item may be used, even if not themed to a holiday or event. For example, the item may be an animated dog, cat, or any animal; unicorn, monster, dragon, or any imaginary creature; even an animated house, rock, tool, etc. may be utilized.

Note that when it is discussed that the decorative item is themed, this is predominantly directed to the outside shape of the decorative item, which may be made out of any suitable material, including plastic, wood, metal, composite materials, ceramic materials, etc.

The animation of the decorative item is generally directed to a face or one or more features or elements. Such face, feature, or elements may be projected from an internal projector onto an inner surface of a transparent or opaque material, such that the animation may be viewed from the outside. Projection systems may vary in both resolution, throw (and potential use of mirrors or other mechanisms to increase throw), etc.

The decorative item may include one or more speakers to play various sounds, songs, sayings, etc., which may correspond with animations to appear as if the decorative item is talking, singing, etc.

The present application is generally directed to various embodiments that may utilize one or more sensors in order to create a more interactive, communicative, and/or enjoyable experience.

For example, such items may include a voice activated sensor. A user may say specific words and/or lines to initiate or trigger the item to say something or act in a specific or random manner. For example, a user may say "Hey Jack, tell me a joke," after which the item may select a random joke from a library of prerecorded jokes. Additional commands could be "sing me a song," "tell me a story," or even responses to general questions "what's your favorite color" or "what's your favorite food." In accordance with some embodiments, the item may be configured to sing with a user, for example by reciting refrains such as "fa la la la la la la," or by taking parts in a duet, such as the song "Baby It's Cold Outside."

It is also contemplated that two or more items may interact with each other through such audio sensors. For example, a user may ask a first item to "tell me a joke," and after a joke is told, a second item may say something along the lines of "that's not funny. My joke is funny . . . " and proceed to tell a second or third joke. In this manner the items may interact not just with the user, but with each other. Entertaining arguments, songs, stories, etc. may be told by more than one item. Note that there are various ways that items may be configured for such interactivity. For example, there may be a selector (physical, digital, or virtual (e.g., via an application)) that may place an item in a stand-alone state, interactive state, responsive only state, etc. In this manner, a user may control the trigger of interactivity, rather than be barraged by a cacophony of singing/joking/talking decorative items.

In accordance with some embodiments, a decorative item may include one or more motion or light sensors (for example, but not limited to, an infrared sensor). When the sensor detects motion or movement, the item may play a statement and corresponding animation. For example, a pumpkin for Halloween may say "There's no more Halloween candy . . . keep walking buddy," or something of the like.

Note that it is contemplated to have inter-operative capabilities between various sensors. For example, decorative item A may detect motion (via a motion sensor) and play a statement. Decorative item B may hear the statement (via a sound sensor) and respond, and so on. In accordance with some embodiments, multiple items may play off of each other, joke back-and-forth, hold conversations, sing songs, etc. as a group.

It is also contemplated that some motion sensors may be configured to detect and/or recognize specific gestures, movements, or motions. For example, a decorative item may detect when a user pretends to give it a "high-five" and may respond in accordingly. Items may detect a user's general gestures—such as hopping or jumping—or may be configured to detect more fine-tuned gestures—such as pretending to conduct music with a finger, or using "finger-guns" to "fire" at the item.

In accordance with some embodiments, a decorative item may be configured with one or more touch sensors disposed on various portions of the decorative item itself. For example, a decorative turkey may have a sensor disposed in its abdomen area, touching or poking of which may trigger to device to admit a laughing "gobble gobble." Touch sensors may be placed through a decorative item, such that the device may generate a statement or joke depending on the portion of the item pressed or touched by a user.

It is also contemplated that a decorative device may include a sensor that determines if various accessories are present. For example, a decorative item in the shape of a snowman may be equipped with a "magic" hat, like Frosty the Snowman. When the hat is removed, the item may detect its removal and state "give me my hat back." Or when the hat is placed on the snowman's head, it may "come alive" and sing, dance, or talk.

It is also contemplated that a decorative item may interact with a remote sensor. Remote sensor may be wireless, or may be wired to the decorative item. For example, a decorative item in the shape of a pumpkin may be placed on a porch, with a remote sensor placed along a sidewalk or under a welcome mat. When a user trips the remote sensor (for example, via motion or weight on the welcome mat), the decorative item may begin to play statements, songs, jokes, motions, animations, etc.

In some embodiments, the decorative item may also be equipped with a movement or acceleration sensor, which may indicate that the decorative item is being picked up or moved. When such inputs are received the decorative item may play a subset of statements—such as "put me down!", "where are we going", "are we running away together", "oh wait, I forgot something", "let's roll!", etc. Similarly, in the case of a crash or impact, the decorative item or device (for example a toy car) may utter "Ouch, that hurt!", "that's going to leave a mark!" or the like.

It is also contemplated that various devices may be configured to access various libraries of statements, songs, jokes, etc. This may be useful for multiple reasons. For example, during holiday season a snowman may be configured to draw statements, jokes, songs, etc. from a data base of Christmas items, or a database of Channukah items. In a different variation, a decorative item in the home of a family with young children may draw upon younger jokes or more accessible statements, while an item in a predominantly adult household may be configured for more adult content, for example more risqué jokes or innuendos.

In accordance with some embodiments of the present invention, the decorative item may comprise an equalizer chip or other similar functionality, which may enable a user to speak into a remote microphone (or smartphone, through the use of a corresponding application), and have the decorative item "say" what is being spoken. Various movement or motion of the item, facial features, etc. may accompany the playback. In addition to repeating real-time, near real-time, or live audio input into a remote microphone, it is also contemplated that a decorative item may playback recorded messages or sayings. In this manner, a remote user—for example, a grandparent located geographically remote from the decorative item—may leave a fun "message" that may be replayed through the item.

In accordance with some embodiments, a decorative item ay be equipped with remote connectivity, such as through a WiFi, Bluetooth, Near Field Communications (NFC), etc. connections. Using such remote connectivity, the decorative item may download additional information—such as songs, sayings, jokes, even "personalities." It is also contemplated that a user may use an application running on a smart phone to download such information, and then may provide such information to the decorative item through a second connection, which may be, for example, wired or via Bluetooth.

As noted above, a decorative item may comprise a projector to project an animation that may make the character appear to be moving, talking, singing, or otherwise alive. In some embodiments, the animation of the facial expressions, etc. may be programmed to correspond with words being played, songs, etc. However, in accordance with some embodiments of the invention, the projector may play recorded, live, real-time, or near real-time via the projector onto the "face" of the decorative item. In this manner, anyone with a corresponding application may record video—or provide a real-time or near real-time video feed. This video or video feed may be projected by the projector onto the "face" of the decorative item, thereby, for example, making it look like a grandparent several states away is a singing Christmas tree.

In accordance with some embodiments, the decorative item may include a camera or other image input device which may receive a video and/or audio-video input. The decorative item may, in accordance with some embodiments, be further equipped with a processor configured to categorize, recognize, and/or determine captures from the camera. For example, a camera may be located at the front of the decorative item, and the device may determine when someone is interacting with the device. The device may be configured to recognize certain items (such as other decorative items, or items associated with a specific event or time—such as pumpkins, Christmas trees, easter eggs, etc. Such recognition or determination may be performed utilizing methods as known in the art, such as but not limited to computer vision technologies.

Cameras may also permit a decorative device to interact with a second decorative device, in a manner in which device 1 projects images or video captured by device 2, and vice versa. In this manner, parties separated by distance may utilize decorative items to communicate with each other in an entertaining and amusing manner.

As briefly mentioned above, there may also be interactivity between various decorative items. For example, a first item may detect an input from a sensor—or even an ON/OFF switch and may determine and play a responsive sound and animation. A second item may respond to the first item, triggered by a sensor that detects the first item's sound or animation, or from a direct communication from the first item (for example, via Bluetooth, NFC, etc.). The second item may respond to the first item. A third item may also be involved in the growing "discussion" between decorative items. Each item may communicate with each other, or may work together—for example, to sing songs together (in parts or in harmony).

A general discussion of animated decorative items is set forth below.

According to various embodiments, a projection system is implemented as an entertainment product that provides life-like and/or interactive displays of animation, such as for example in a holiday context for Halloween, Christmas, and/or the like. For example, it can be used to project animated images on an interior surface of a molded plastic enclosure such as a hollow plastic pumpkin-shaped enclosure, with a singing and/or talking jack-o-lantern face. The projector and/or accessories, such as a speaker and/or a storage device, may be situated within the plastic enclosure. The animated images can be updateable by the user, allowing for a wide variety of animated images, songs, and the like, which can be customized for individual users.

In at least one embodiment, the described device projects customizable animated images onto the interior surface of an enclosure in the form of a decorative plastic figure. An internal storage device (such as an SD card) and/or communications device (such as Bluetooth or Wi-Fi receiver) stores and/or receives audio and/or images, such as static and/or animated images. Animated images can be received from a computing device such as a smartphone or other device, and/or from the Internet. In at least one embodiment, a user can purchase and/or download animated images via a computer or smartphone, for playback on the device.

A projector displays an animated image, such as a face that is singing in sync with music in the audio track. In at least one embodiment, the device inside the enclosure can connect with and communicate with other devices, such as a computing device such as a smartphone, via wired or wireless communication. In this way, the device can be made to play static images, animated images, music, and/or audio as directed by the consumer operating the computing device. In at least one embodiment, a remote control can be provided, to allow a user to select among a number of different images, and/or to control the device in other ways (e.g. to change volume, download additional images, power on/off, and/or the like). Alternatively, such control can be provided via an app running on the computing device.

In at least one embodiment, the device is self-contained; the projector and other components are situated inside the enclosure so that no external projector is required. A power supply (such as a battery) can be included within the enclosure; alternatively, a power cord can be provided that allows the device to be powered from an external source.

In at least one embodiment, a custom lens is employed to enable the short-throw projection of images onto the interior surface. In at least one embodiment, the interior surface may be concave and/or irregular, for example if the enclosure represents a pumpkin. In at least one embodiment, 3D-printed shape-specific lenses and/or mirrors can be used, to enable image focus on an uneven interior surface of the enclosure (e.g. pumpkin ridges, face (nose, eye sockets), and/or the like).

In at least one embodiment, the enclosure is made of plastic that allows infrared ("IR") signals to pass through the device so that a remote control and/or one or more other wirelessly-connected devices can be used to change the images. Vents can be providing on the enclosure to enable sound to emanate from the device.

In various embodiments, the enclosure can be molded into any of a number of unique shapes (such as pumpkin, snowman, face, jewelry mannequin, and the like). Corresponding images for such themed enclosures can be offered.

In at least one embodiment, the system can also include a sensor that detects motion, heat, and/or other conditions to enable the system to react to external events (such as a person walking by) and cause the animated image to change accordingly. In at least one embodiment, an artificial intelligence component can be included, to allow the animated image to speak or interact in real-time, with content that adapts and reacts to environmental stimuli. In yet another embodiment, the animated image can be controlled in real-time by a user.

For example, the device may stream or cast animations and audios from a user device. For example, a video from a website may be sent to the device and projected onto the device face. In addition, a song may be streamed, casted, or sent to the device, and the device may play the song while animating facial expressions as if the device was singing the song. Facial animation may comprise specifically programed phoneme shapes that correspond to specific sounds, in order to give the illusion that the device is singing.

In yet another embodiment, image and/or sound content can be user-customizable. For example, a user can use a web-based application to design greetings, songs, and/or the like, with custom components, such as names for a child's birthday.

In accordance with some embodiments of the present invention, additional features of the device may be triggered by sensor input. For example, a device may include motorized arms that may be raised or lifted. When a sensor of the device determines it has been picked up, sensors may turn on a motor, raising the arms, asking the user "did you want a hug?" Or a single arm or hand could be raised and the device could ask for a "high-five." Similarly, the device could utilize such motorized components in some of its games, jokes, or sayings. For example, the device may play "peek-a-boo" with a user, covering its animated face with motorized arms or hands. Touch sensors may trigger the device to say "I'm glad we're going somewhere . . . . I was bored sitting there!" or the like.

In addition, in accordance with some embodiments of the present invention, devices may comprise a combination of projection and mechanically animated (i.e., animatronic) elements. For example, a character's eyes and nose may be projected, but mouth and jaw may be mechanically operated. In these circumstances, opening and closing of the jaw and mouth may be accomplished in conjunction with animation of the eyes in order to present an illusion that the device is talking.

With reference to FIG. 1, a general device or item 100 in accordance with some embodiments of the present invention will now be discussed. Device or item 100 may comprise a processor 110, one or more audio and/or video drivers 120, a projection system 130, an audio/speaker system 140, and one or more mechanical or animatronic elements 150. Device 100 may also comprise one or more sensors 160, communication module 170, memory or data store 180, inputs 185, and/or a power supply 190.

Figure 2:
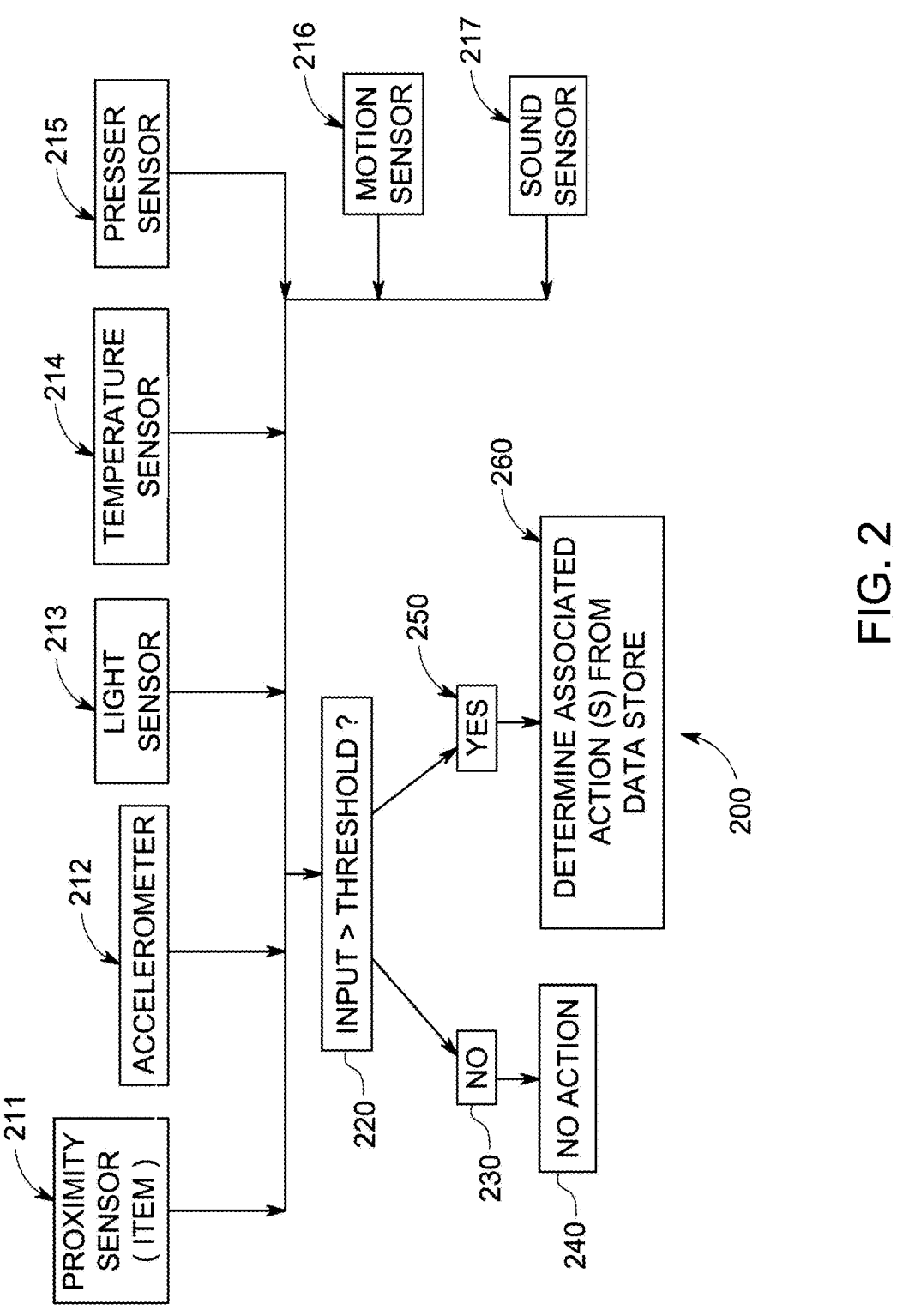
FIG. 2 illustrates an exemplary sensor arrangement and process, in accordance with some embodiments of the present invention.

With reference to FIG. 2, one or more sensors 211-217 may receive an input. Sensors may include, but are not limited to proximity sensor 211, accelerometer 212, light sensor 213, temperature sensor 214, pressure sensor 215, motion sensor 216, and/or sound sensor 217. At 220, it may be determined if the input received from a sensor exceeds a predetermined threshold. If not at 230, then no action is taken at 240. If the input exceeds the predetermined threshold at 250, then the device may determine at 260 which action is associated with the specific sensor input from the data store. The determined action may be subsequently conducted.

Figure 3:
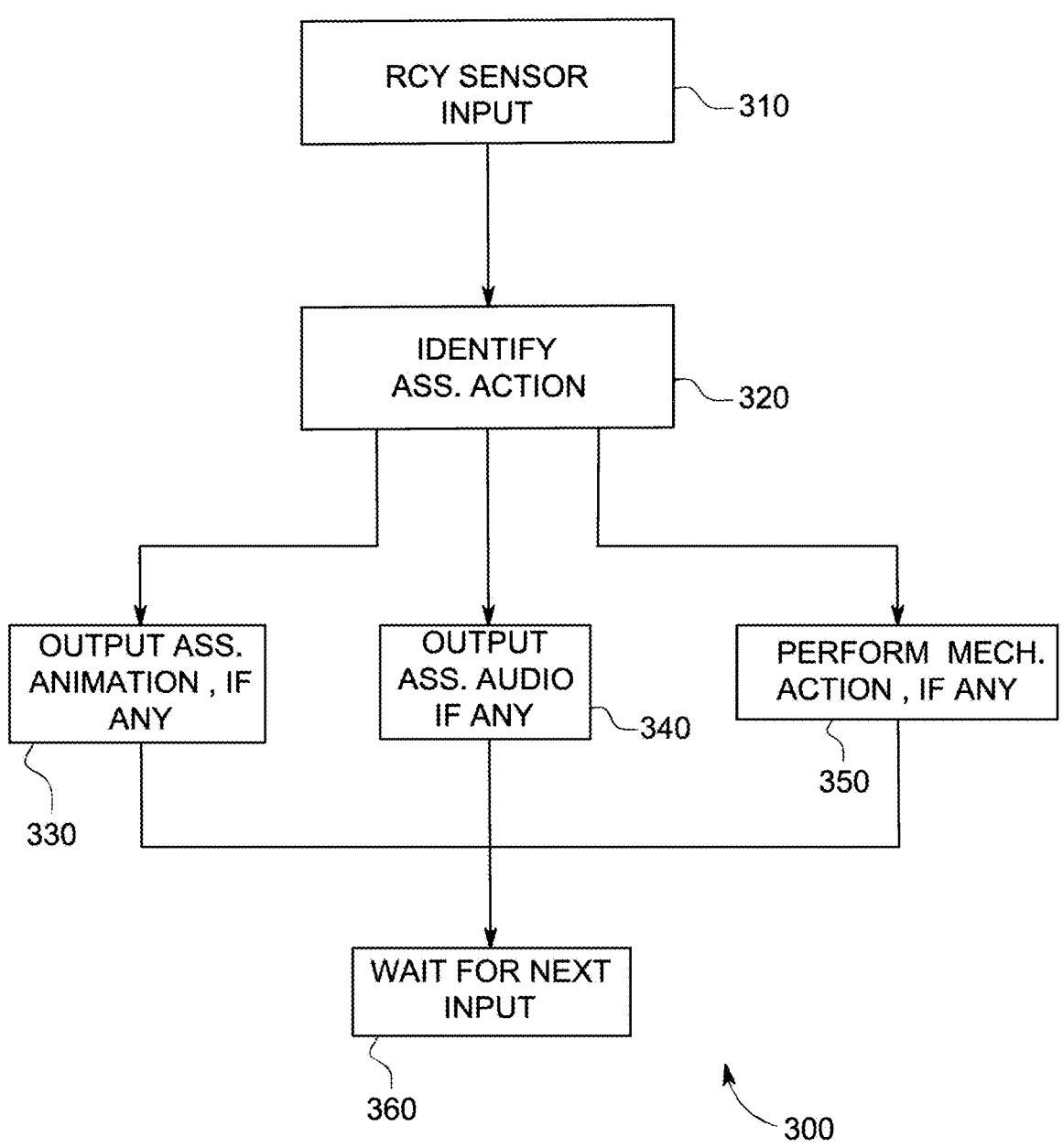
FIG. 3 illustrates an exemplary method, in accordance with some embodiments of the present invention.

With reference to FIG. 3, a more detailed process 300 will now be discussed. At 310 a sensor may receive input, and at 320 an action associated with the specific sensor input may be determined. At 330 the processor may output animation or video associated with the determined action, if any. At 340 the processor may output audio or sounds associated with the determined action, if any. At 350 the processor may output instructions to perform mechanical or physical action, if any. At 360 the processor may then wait to receive the next input from the sensors or other input device.

With reference to FIG. 4, an exemplary chart from a data store will now be discussed. In general, the data stores triggers 410 (or sensor inputs), and actions, comprising projection outputs 420, audio outputs 430, and other outputs 440. At 411 a sensor may be determined that the device was picked up by a user. At 421 the projection may project an animated startled face. At 431 the audio may play "Where are we going?" At 441 the device may raise its mechanically enable arms (if so equipped).

Similarly at 412 the trigger of impact (such as from an accelerometer) may be received. At 422 the animation may show the device closing its eyes tightly; at 432 the device may say "Ouch!"; at 442 the device may shake or quiver. Note that while accelerometers are discussed, various sensor inputs may be utilized. For example, a six (6) axis gyro sensor may be utilized; a spring sensor or ball sensor may also be utilized. Such sensors may detect motion in a specific direction, or may detect multi-axis motion. Once motion is detected, an action may be triggered based on the motion. For example a car may be directed by a user (for example, through a remote control) to turn left, and the car may play audio "Why we going left? I'm always RIGHT!" If the sensors detect rearward movement, the car may play audio "I can't see where I'm going!" When these audio clips are played, they may be accompanied by animation of the cars face, for example, closing its eyes when going backwards, or looking to the left when turning left.

At 413 the device may receive a trigger of a user asking for a joke. At 423 the animation may track that of the audio presented at 433, which may select a joke from a list of jokes. At 443 there may not be any mechanical action.

At 414 the device may determine the ambient lights were turned off. At 424 the device may have a scared face—or perhaps a mean face. At 434 the device may ask "what happened?" or utter a mean, scary laugh. There may not be any mechanical action at 444.

At 415 an input device may identify a user (even a specific user). At 425 the projection may smile, and at 435 the audio may play "Hi, Tommy! High five!" At 445 one arm may raise for an animatronic high-five.

Figure 5:
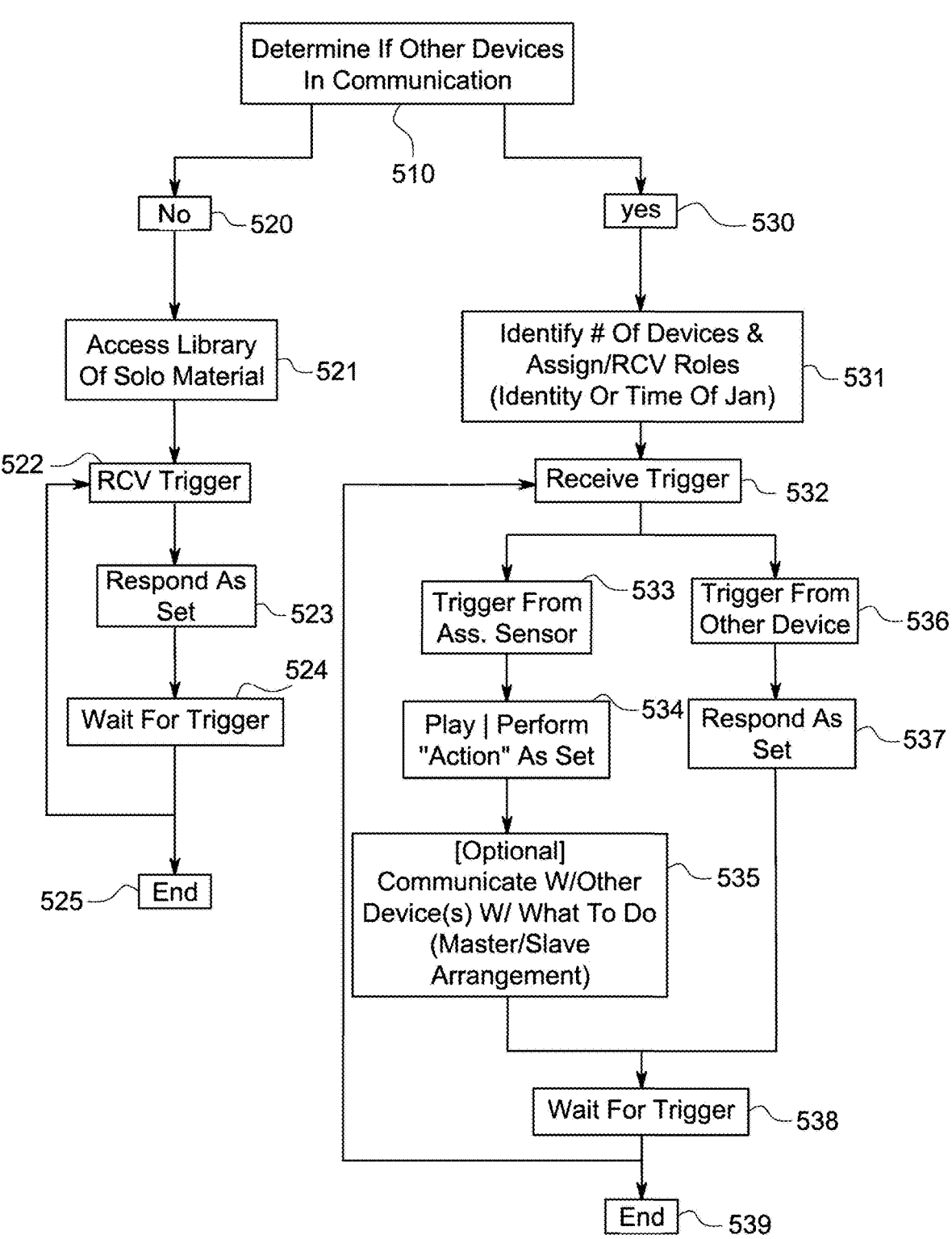
FIG. 5 illustrates an exemplary method, in accordance with some embodiments of the present invention.

At FIG. 5 a general process may be described in which a device may determine if there are other interactive devices in communication. At 510, this determination is made. At 520, it is determined the device is alone and at 521 a library of solo material may be accessed from a datastore. At 522 the device may receive a trigger, respond to the trigger with the solo material at 523, and wait for an additional or subsequent trigger at 524. The process may end at 525.

Alternatively, the device may determine at 530 that there are other devices in communication. At 531 the number of devices and roles of the devices may be determined. Roles may be determined based on device identity, time of joining, or other criteria. At 532 a trigger may be received. If the trigger is received from the device's sensos at 533 then an associated action may be played at 534. At 535 the device may optionally communicate with other devices, such as informing the other devices what to do or act (such as in a "master-slave" relationship). Once performed, the device may then wait for an additional trigger at 538 or end the process at 539.

If the trigger is received from another device at 536, then the device may respond to the trigger as either programmed in its database, or as requested by the other device at 537, after which it will again wait for an additional trigger at 538 or end the process at 539.

Figures 6A, 6B, 7A, 7B, 7C:
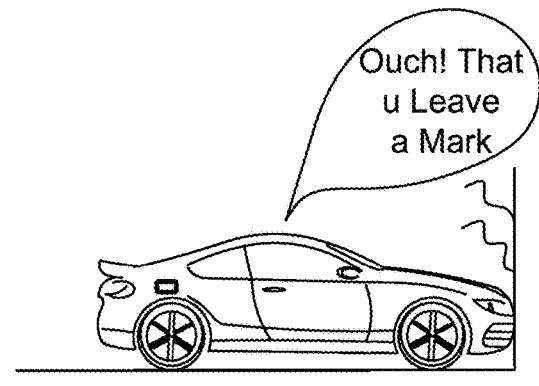
FIGS. 6A-6B illustrate an application of the present invention.
FIGS. 7A-7C illustrate an application of the present invention.

With reference to FIGS. 6A-6B, 7A-7C, 8, 9A-9B, 10A-10B, 11, and 12, applications of the devices in accordance with some embodiments of the present invention will now be discussed. FIG. 6A shows a device, stationary, saying "Hello. I'm Jack!" At FIG. 6B the device is moved by a user, triggering a sensor, and causing the device to look scared and say "Where are you taking me?"

At 7A a device may be stationary and recite "I want to race." At 7B the device may be moving, as indicated by a sensor, and may say "Whee! I'm winning!" At 7C the device may have struck a wall, as indicated by a sensor, and may say "Ouch! That'll leave a mark . . . ."

Figure 8:
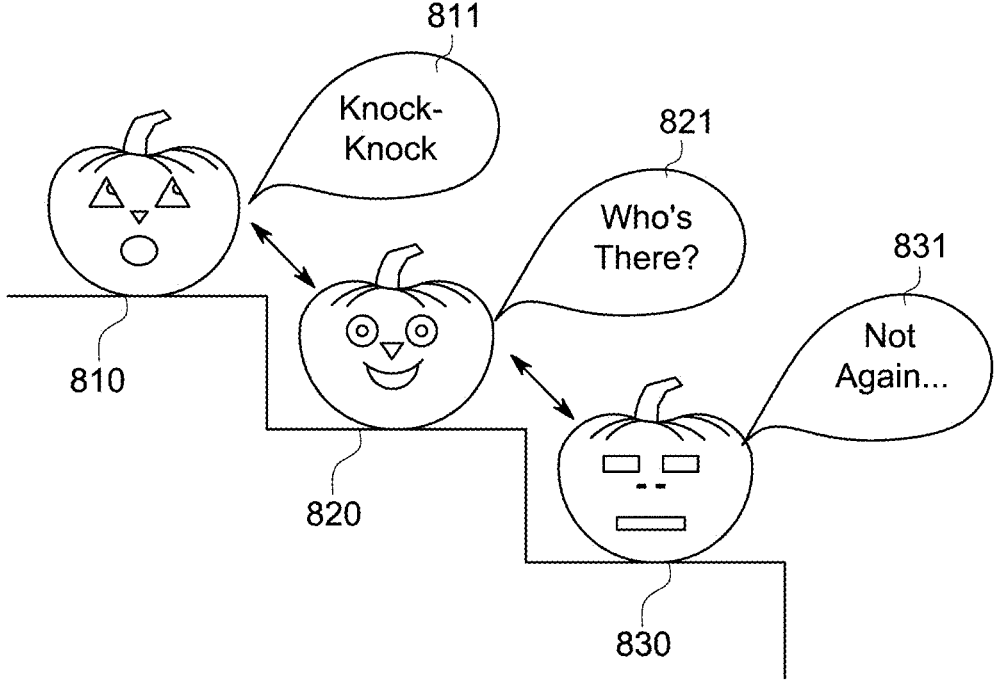
FIG. 8 illustrates an application of the present invention.

FIG. 8 illustrates exemplary interactivity between multiple devices, in accordance with some embodiments of the present invention. In FIG. 8, there are three devices, 810, 820, 830. Device 810 may start a communication, such as at 811: "Knock knock." Device 820 may be triggered by this first communication and respond at 821, "Who's there?" Device 830 may be triggered by the first or second communication, and may respond at 831, "Not again . . . "

Figure 9A:
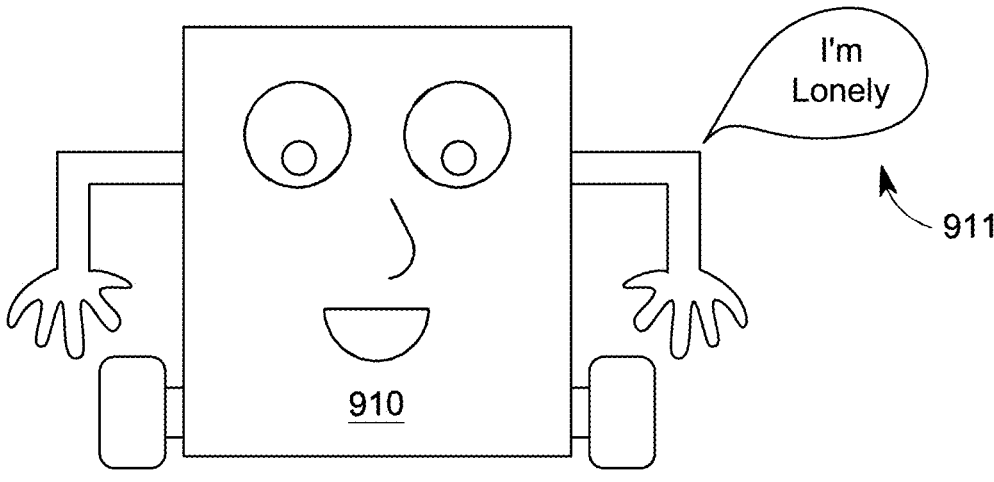
FIGS. 9A-9B illustrate an application of the present invention.
Figure 9B:
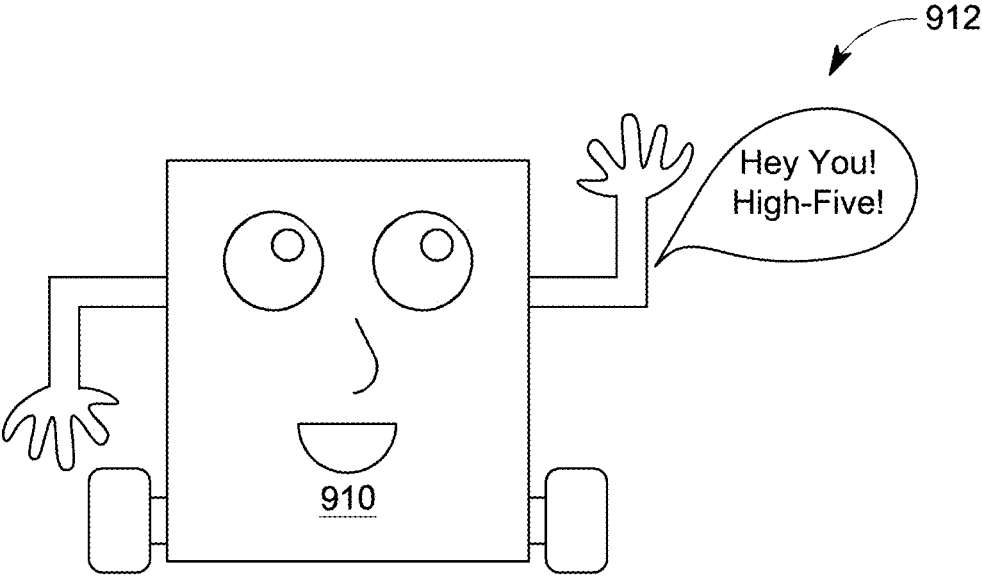
Figure 10A:
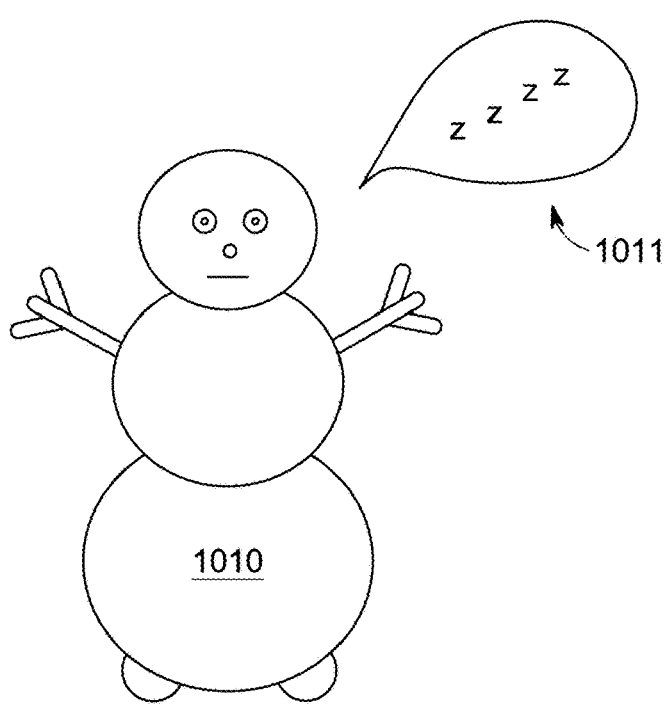
FIGS. 10A-10B illustrate an application of the present invention.
Figure 10B:
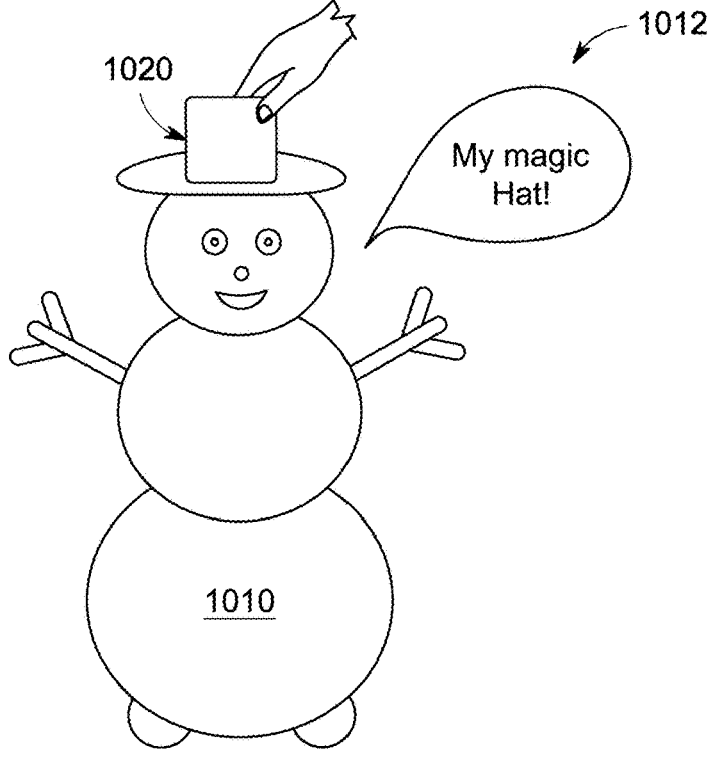

FIGS. 9A and 9B illustrate exemplary animatronic actions in response to a sensor input, in accordance with some embodiments of the present invention. Device 910 may, untriggered by a sensor (or triggered by the lack of sensor input) to communicate at 911, "I'm lonely." When a sensor on the device provides input that there is motion nearby, the device may project a face towards the motion, raise an arm, and say at 912 "Hey you! High-Five!"

In accordance with some embodiments of the present invention, devices may also be triggered into action based on sensor inputs related to other items, such as accessories. For example, with reference to FIGS. 10A and 10B, snowman 1010 may at FIG. 10A not have an accessory (such as a hat) and may be sleeping. The snow man may communicate snoring or something of the like at 1011. When a hat 1020 is placed on the snowman, it may be detected by a sensor, and trigger an action. The snowman's face may be animated and happy, and the snowman may say at 1012, "My magic hat!"

Figure 11:
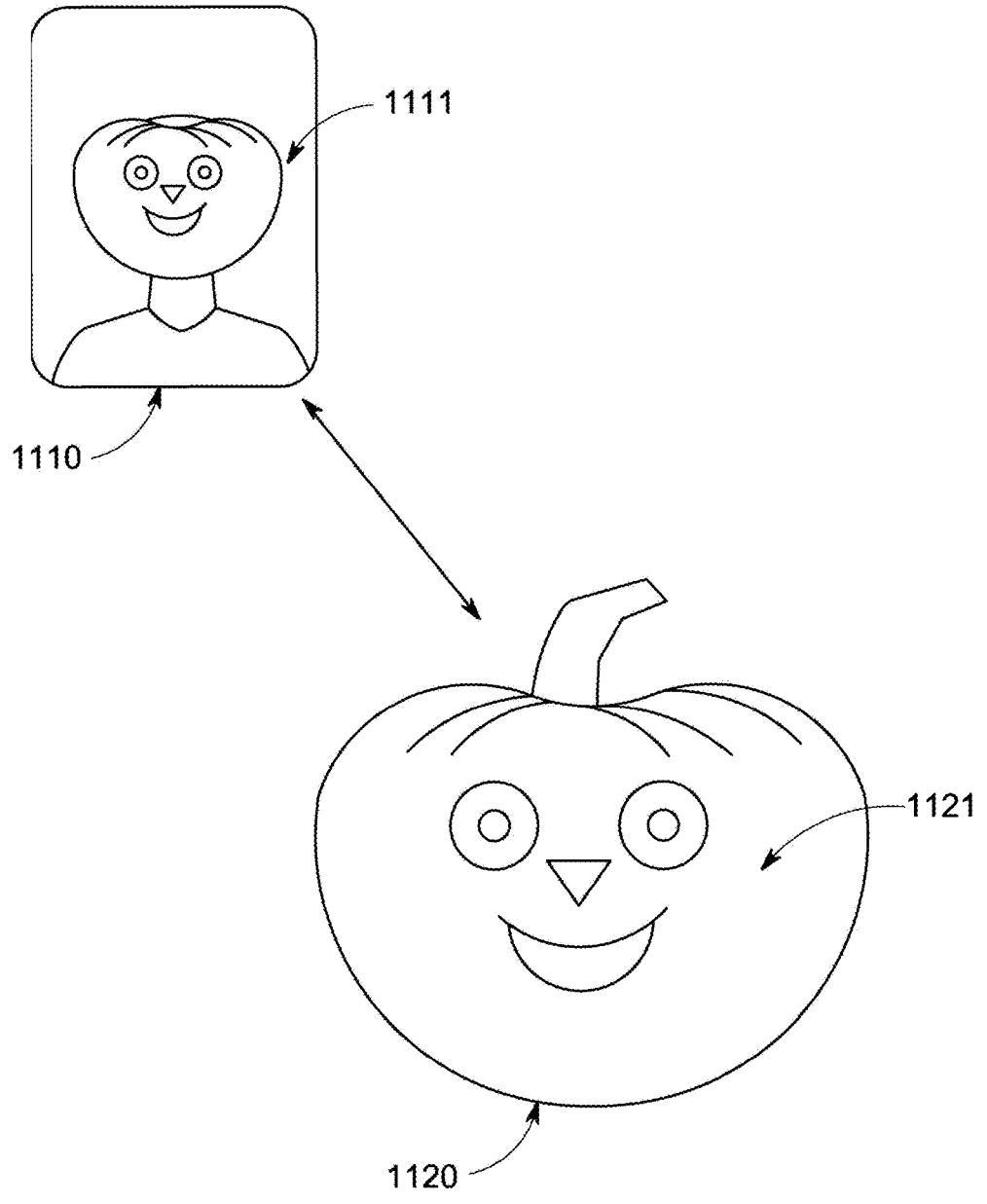
FIG. 11 illustrates an application of the present invention.

With reference to FIG. 11, it is contemplated that a device in accordance with some embodiments of the present invention may stream or cast videos from a user's mobile device 1110. For example, if a user is on a video call the video feed of a person 1111 may be transmitted to a device 1120, and the device may project the video feed of the person 1121 onto the device. Similarly, the device may stream the audio feed from the user device 1110.

Figure 12:
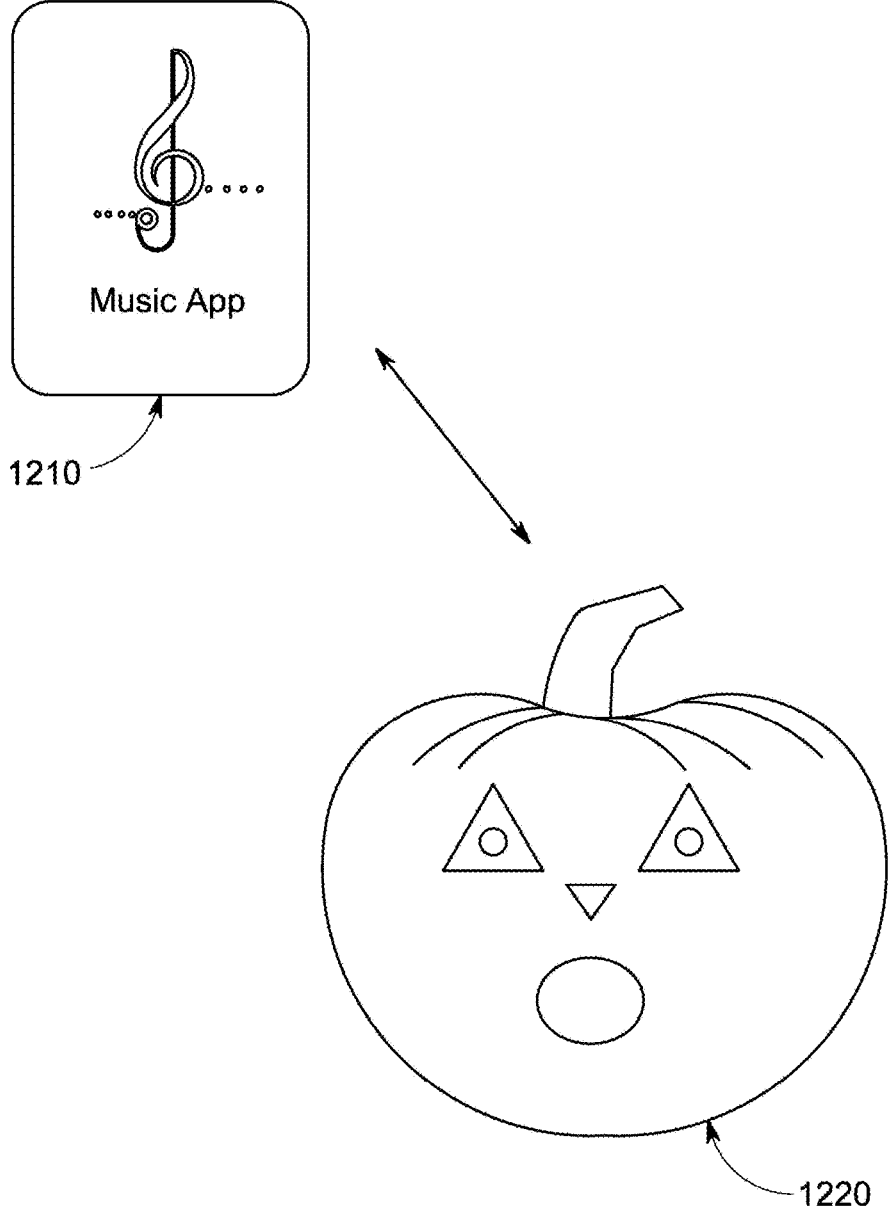
FIG. 12 illustrates an application of the present invention.

Similar to FIG. 11, FIG. 12 illustrates an exemplary relationship between an audio source and a device, in accordance with some embodiments of the present invention. A user device 1210 may play audio—either recorded or streaming. The audio may be sent to the device, for example via Bluetooth or NFC communication. The device may receive the audio, play or broadcast the audio, and exhibit animation associated with the audio. For example, as noted above, a facial expression of a character on a device may be broken into several phoneme shapes and associated sounds. As the sounds are received, the device may project the appropriate phoneme shapes, such that it looks like the face projected on the device is singing the music that is streamed by the user's mobile device.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A device comprising:

a projector, contained within cavity and configured to project an animated image that causes at least one physical feature of the decorative shape to appear to be moving, when viewed from an exterior of the device; and an exterior wall defining a cavity therein, the exterior wall comprising an interior surface and an exterior surface, the exterior wall having a thickness and material composition selected such that, in response to projection of the animated image onto the front portion of the interior surface, the animated image is visible on the exterior surface;

a communication module configured to receive wireless instructions to the projector by receiving signals from a wireless communication device through the exterior wall;

a non-transitory computer-readable medium comprising computer code stored thereon, that when executed by a processor of a computing device operatively connected to the projector, controls display of the animated image on the exterior surface;

at least one sensor, selected from the group of an accelerometer, light sensor, temperature sensor, pressure sensor, motion sensor, accelerometer, spring sensor, ball sensor, and angular velocity sensor;

the at least one sensor configured to detect at least one condition of the device comprising motion of the device, orientation of the device, or impact of the device, the at least one sensor operatively connectable to the projector to activate, deactivate, and/or modify display of the animated image and/or any associated audio in response to detection of the condition.

2. The device of claim 1, further comprising a remote control configured to control operation of the projector and device by transmitting signals to the device.

3. The device of claim 1, further comprising an audio output device configured to output an audio track, wherein the animated image is projected in synchronization with the audio track.

4. The device of claim 1, wherein the computer code is further configured, when executed by a processor, to control display of the animated image by:

generating animated image data;

initiating transmission of the animated image data to the projector;

generating audio data representing an audio track; and initiating transmission of the audio data to an audio output device configured to output the audio track, wherein the animated image is projected in synchronization with the audio track.

5. The device of claim 1, wherein the computer code is further configured, when executed by a processor, to control display of the animated image by:

causing an input device to receive user input from a user;

in response to receipt of the user input, generating the animated image data; and initiating transmission of the animated image data to the projector to cause the projector to display the animated image.

6. The device of claim 1, wherein the computer code is further configured, when executed by a processor, to control display of the animated image by:

causing a sensor to generate sensor data based on detection of at least one condition of the device or an environment of the device;

in response to receipt of the sensor data, generating the animated image data; and initiating transmission of the animated image data to the projector to cause the projector to display the animated image.

7. The device of claim 6, wherein the at least one sensor comprises one or more of a proximity sensor, accelerometer, light sensor, temperature sensor, pressure sensor, motion sensor, sound sensor, spring sensor, ball sensor, and/or angular velocity sensor.

8. The device of claim 6, wherein the at least one condition of the device or an environment of the device comprises one or more of presence of a user, motion of the user, sound made by the user; motion of the device, impacts of the device, proximity of other devices, and/or control signals received from a user.

9. The device of claim 1, wherein:

the at least one physical feature comprises a representation of a mouth;

the projected animated image comprises a representation of an animated mouth that causes the physical feature to appear to be vocalizing.

10. The device of claim 1, wherein the projector is configured to project the animated image in a manner that takes into account the at least one physical feature of the decorative shape.

* * * * *